(12) United States Patent
Tovornik

(10) Patent No.: US 10,160,373 B2
(45) Date of Patent: Dec. 25, 2018

(54) UTILITY TRUCK BED

(71) Applicant: Edward J. Tovornik, Frederick, MD (US)

(72) Inventor: Edward J. Tovornik, Frederick, MD (US)

(*) Notice: Subject to any disclaimer, the term of this patent is extended or adjusted under 35 U.S.C. 154(b) by 355 days.

(21) Appl. No.: 15/173,755

(22) Filed: Jun. 6, 2016

(65) Prior Publication Data
US 2017/0106780 A1 Apr. 20, 2017

Related U.S. Application Data

(60) Provisional application No. 62/242,348, filed on Oct. 16, 2015.

(51) Int. Cl.
*B60P 3/14* (2006.01)

(52) U.S. Cl.
CPC ..................... *B60P 3/14* (2013.01)

(58) Field of Classification Search
CPC ........................................................ B60P 3/14
USPC ...................................... 296/10, 24.32, 37.6
See application file for complete search history.

(56) References Cited

U.S. PATENT DOCUMENTS

| 4,219,141 A | 8/1980 | Lovy |
| 4,251,100 A * | 2/1981 | Rolandelli ............. A61G 3/003 280/801.1 |
| 4,283,083 A | 8/1981 | Johnson |
| 4,469,364 A * | 9/1984 | Rafi-Zadeh ............ B60R 11/06 224/404 |
| 4,705,315 A * | 11/1987 | Cherry .................... B60R 11/06 296/24.45 |

(Continued)

FOREIGN PATENT DOCUMENTS

JP 2012-57452 3/2012

OTHER PUBLICATIONS

2000 Chevrolet 3500HD Cone Truck, YouTube Video, https://www.youtube.com/watch?v=vB3aqiBWAf8 published Jun. 2, 2014. (Year: 2014).*

(Continued)

*Primary Examiner* — Dennis H Pedder
(74) *Attorney, Agent, or Firm* — Whiteford, Taylor & Preston, LLP; Gregory M. Stone

(57) ABSTRACT

Disclosed is a utility truck bed comprising one or more of the following elements: (i) two worker stations located behind the cabin of the truck, each of which comprises a passenger well with a floor that is horizontally positioned below the bottom plane of the rest of the bed; (ii) a safety gate on the outside of the bed that slides horizontally to provide access to the well; (iii) a safety harness for connecting the worker to a fixed portion of the assembly; (iv) a sliding safety gate adjacent the passenger well on the inside of the bed; and (v) storage compartments positioned on the back of the truck bed, each extending longitudinally away from each worker station and positioned to provide sufficient space between each compartment to place working materials that do not fit in the storage compartments. Each storage compartment may include a closed box portion, an open box portion with guide rails to accommodate materials but allow the worker to have full view of the road behind the truck, and a safety guard to keep materials secured within the open box.

21 Claims, 9 Drawing Sheets

(56) References Cited

U.S. PATENT DOCUMENTS

| | | | |
|---|---|---|---|
| 4,861,096 A * | 8/1989 | Hastings | B60J 5/0497 |
| | | | 280/834 |
| 4,938,398 A | 7/1990 | Hallsen | |
| 5,848,744 A | 12/1998 | Dischner et al. | |
| 6,176,540 B1 | 1/2001 | Whittaker | |
| 6,364,400 B1 * | 4/2002 | Unrath | E01F 9/662 |
| | | | 296/1.05 |
| 6,409,064 B1 | 6/2002 | Bayley | |
| 7,101,143 B2 | 9/2006 | Orthaus et al. | |
| 7,114,754 B2 | 10/2006 | Morello | |
| 7,195,299 B2 | 3/2007 | Steffens et al. | |
| 7,431,532 B2 | 10/2008 | Lidster | |
| 7,942,295 B1 | 5/2011 | Hume | |
| 8,047,384 B2 | 11/2011 | Mrowiec | |
| 8,348,322 B2 | 1/2013 | King | |
| 8,403,192 B1 | 3/2013 | Roller et al. | |
| 8,653,988 B2 | 2/2014 | Legare et al. | |
| 9,056,572 B2 * | 6/2015 | Hemphill | B60P 1/02 |
| 2001/0000120 A1 | 4/2001 | Unrath | |
| 2011/0000943 A1 | 1/2011 | Krebsbach | |
| 2011/0169289 A1 | 7/2011 | Arnold et al. | |
| 2014/0021232 A1 | 1/2014 | Lazarevich et al. | |

OTHER PUBLICATIONS

"Aluminum Concrete Contractor Truck Bed." truckbeds.com. Aug. 25, 2015. http://truckbeds.com/cms-homepage.asp?page=installation_gallery&product=156.

"PUD Utility Truck / Spool Carrier." truckbeds.com. Aug. 25, 2015. http://truckbeds.com/cms-homepage.asp?page=installation_gallery&product=69.

"Sign Crew Truck." truckbeds.com. Aug. 25, 2015. http://truckbeds.com/cms-homepage.asp?page=installation_gallery&product=72.

"2000 Chevrolet 3500 HD Traffic Management Cone Truck for Sale" (Truck Site) [youtube.com] Jun. 2, 2014. https://www.youtube.com/watch?v=1S8yfDcVccs.

International Search Report issued in co-pending International Application No. PCT/US2016/057020 dated Feb. 7, 2017.

* cited by examiner

UTILITY TRUCK BED

CROSS REFERENCE TO RELATED APPLICATION

This application is based upon and claims benefit of U.S. Provisional Patent Application Ser. No. 62/242,348 entitled "UTILITY TRUCK BED," filed with the United States Patent and Trademark Office on Oct. 16, 2015 by the inventor herein, the specification of which is incorporated herein by reference.

FIELD OF THE INVENTION

This invention relates generally to providing safe, functional environments on work vehicles, and more particularly to a utility truck bed configured to provide improved storage configurations and access for workers while safely positioning workers during service operations in traffic.

BACKGROUND OF THE INVENTION

Road crews are frequently called upon to perform various road repair and maintenance operations in traffic conditions. Those operations typically require that a vehicle carrying signs, markers, traffic cones, and the like proceed very slowly, often in a traffic lane on the roadway, as the work crew places such signs, markers, traffic cones, etc. on the road to direct road traffic around the work zone. Such operations can be quite dangerous for the road crew who are openly exposed to passing traffic. For example, if the road crew walks behind or alongside the vehicle while pulling off and placing markers, they are directly exposed to risk of being struck by oncoming traffic. If the road crew stand on the platform of a typical work truck, they are forced to excessively bend down to be able to place such markers on the road surface.

Moreover, to best ensure against the risk of being struck by oncoming traffic, road crews would be best situated by being able to both easily access markers stored on the vehicle and place those markers on the road surface, all while easily viewing their surroundings so as to be able to see oncoming traffic and take evasive action if necessary to avoid being struck by such oncoming traffic. While some prior efforts have been made to improve a vehicle-born worker's ability to place markers on the road surface while standing on a portion of the vehicle, such efforts are lacking in simultaneously providing easy access to markers and other work materials stored on the vehicle, with storage of such work materials situated on the vehicle so as to ensure that the worker maintains full visibility of their work environment, and particularly visibility of oncoming traffic.

SUMMARY OF THE INVENTION

A modified utility truck bed is disclosed for road work projects that increases efficiency while protecting highway workers. In accordance with certain aspects of an embodiment of the invention, a utility truck bed is provided comprising one or more of the following elements: (i) two worker stations located behind the cabin of the truck, each of which comprises a passenger well with a floor that is horizontally positioned below the bottom plane of the rest of the bed, allowing a worker to stand in the well and easily place road signs, cones, and other markers on the road; (ii) a safety gate on the outside of the bed that slides horizontally to provide access to the well; (iii) a safety harness, such as a three-point hitch, for connecting the worker to a fixed portion of the assembly and at a location allowing the worker to easily access materials stored on the truck bed and place those materials on the road surface; (iv) a sliding safety gate adjacent the passenger well on the inside of the bed to keep road markers, tools, and other materials away from the worker; and (v) storage compartments positioned on the back of the truck bed, each extending longitudinally away from each worker station and positioned to provide sufficient space between each compartment to place working materials that do not fit in the storage compartments. Moreover, each storage compartment may include a closed box portion, an open box portion with guide rails to accommodate materials but allow the worker to have full view of the road behind the truck, and a safety guard to keep materials secured within the open box.

A utility truck bed configured as above provides road work crews with one or more of the following benefits: (i) a safe environment in which to perform traffic control setups; (ii) workers are secured with a harness to restrain them while placing material; (iii) provides better visibility for the driver and worker to perform traffic control device setups; (iv) workers are provided with a safe entry and exit in dangerous work environments; (v) traffic control materials are stored in an organized fashion enabling safe and quick access; (vi) traffic control materials are secured, keeping them from shifting and injuring workers; (vii) amber warning lights may be installed in locations that will not interfere with the vision of the driver or the onboard worker; (viii) amber lights may provide proper advance warning to the public and vehicular traffic; and (ix) the system can be safely installed on an industry standard ½ ton, ¾ ton, and 1 ton truck or larger.

In accordance with certain aspects of an embodiment of the invention, a utility truck bed is provided having a horizontal truck bed platform having a top surface, a bottom surface, a front edge, a rear edge, a first side edge, and a second side edge; a well extending downward from the horizontal truck bed platform, the well having a front side wall, a rear side wall, an interior side wall extending between the front side wall and the rear side wall, and a well floor attached to a bottom edge of the front, rear, and interior side walls, wherein the front side wall and rear side wall of the well extend parallel to the front edge and the rear edge, respectively, of the truck bed platform; a first storage compartment on the top surface of the truck bed platform positioned inward from the first side of the truck bed platform a distance at least equal to a length of the front and rear side walls of the well; and a second storage compartment on the top surface of the truck bed platform positioned between the first storage compartment and the first side edge of the truck bed platform, and between the well and the rear edge of the truck bed platform, the second storage compartment having a height dimension that is shorter than a height dimension of the first storage compartment.

In accordance with further aspects of an embodiment of the invention, a utility truck bed is provided having a horizontal truck bed platform configured for retrofit attachment to a vehicle frame; a first well extending downward from the horizontal truck bed platform and opening to a first side edge of the truck bed platform, the first well having a first well floor positioned at a height below the horizontal truck bed platform; a second well extending downward from the horizontal truck bed platform and opening to a second side edge of the truck bed platform, the second well having a second well floor positioned at a height below the horizontal truck bed platform; a first storage compartment on the truck bed platform positioned inward from the first side edge of the truck bed platform; a second storage compartment on the truck bed platform positioned between the first storage compartment and the first side edge of the truck bed platform, the second storage compartment having a height dimension that is shorter than a height dimension of the first storage compartment; a third storage compartment on the truck bed platform positioned inward from the second side edge of the truck bed platform; and a fourth storage compartment on the truck bed platform positioned between the third storage compartment and the second side edge of the truck bed platform, the fourth storage compartment having a height dimension that is shorter than a height dimension of the third storage compartment.

BRIEF DESCRIPTION OF THE DRAWINGS

The numerous advantages of the present invention may be better understood by those skilled in the art by reference to the accompanying drawings in which.

DETAILED DESCRIPTION

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
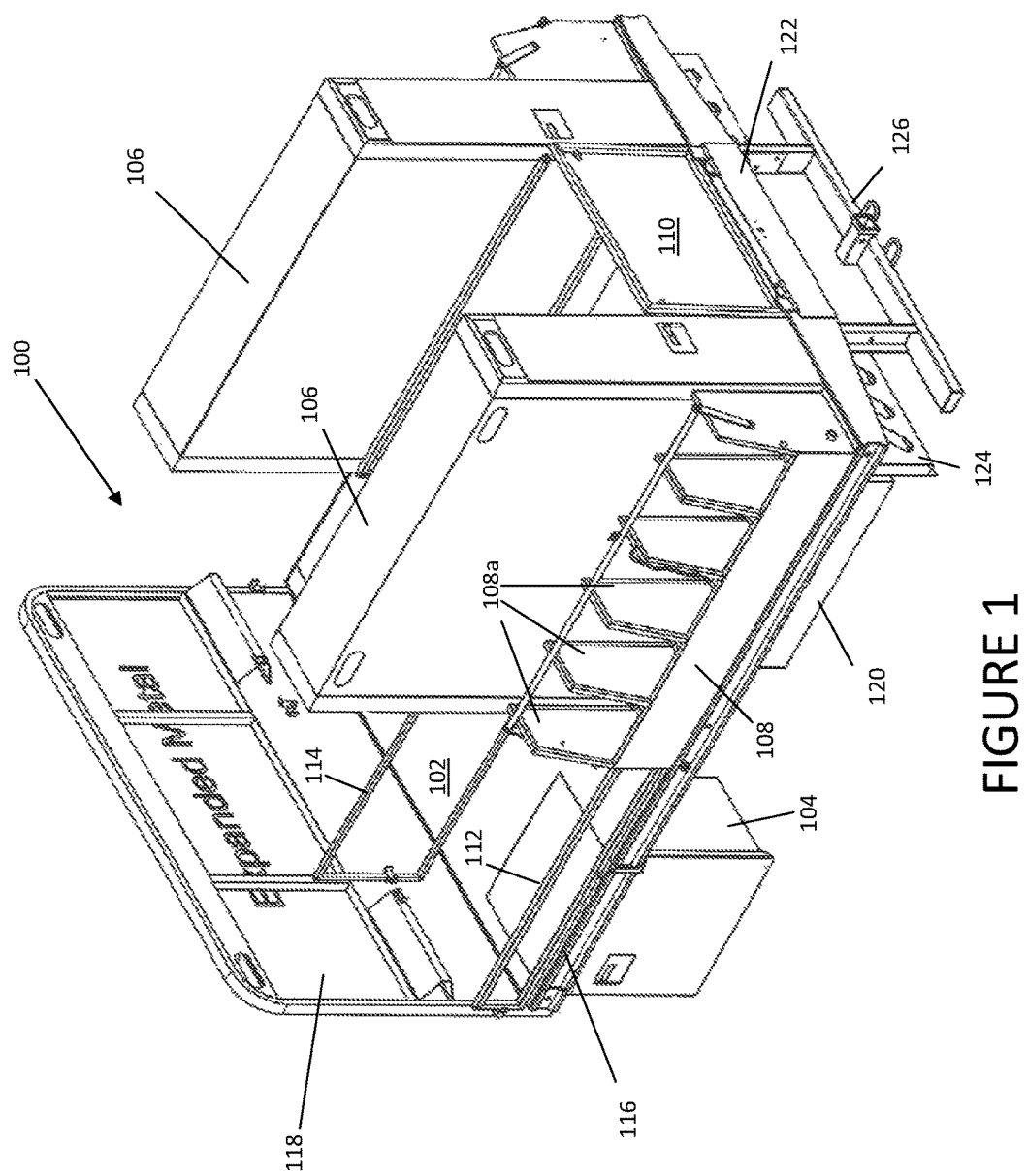
FIG. 1 is a perspective view of a utility truck bed in accordance with certain aspects of an embodiment of the invention.

FIG. 1 is a perspective view of a utility truck bed (shown generally at 100) in accordance with certain aspects of an embodiment of the invention. Utility truck bed 100 comprises a planar floor forming a top platform 102 of the flat bed. Manhole assemblies formed by passenger wells 104 are provided on opposite sides of top platform 102 and adjacent a front end of utility truck bed 100, which manhole assemblies 104 extend downward from top platform 102. Thus, a worker may stand within one of manhole assemblies 104, allowing them to both easily access materials positioned on top platform 102, and to place such materials on the road surface adjacent the vehicle.

In order to provide storage of such work materials, storage lockers 106, such as boxes sized to hold road signs, are positioned on top platform 102. Storage lockers 106 extend longitudinally toward the back end of utility truck bed 100, with a back face of each storage locker 106 being aligned with the back end of utility truck bed 100. Moreover, storage lockers 106 are positioned inward from an outer side edge of utility truck bed 100. Importantly, such positioning of storage lockers 106 with respect to manhole assemblies 104 allows a worker positioned in a manhole assembly 104 to view the side and rear environment around the vehicle, providing a clear line of sight to oncoming traffic and thus allowing a worker who is positioned in a manhole assembly 104 to take evasive action if necessary to avoid oncoming traffic.

Storage boxes 108 are preferably positioned between the outer side edge of top platform 102 and the outer wall of each storage locker 106. Each storage box 108 includes a number of separate compartments formed by a plurality of vertical walls 108a that may be used to carry stands and other equipment. A tailgate 110 is preferably mounted between storage lockers 106 and is configured to swing downward to allow access to top platform 102 from the rear of utility truck bed 100. Additional storage compartments may be provided, including one or more side-facing storage boxes 120 which may be accessed from a side of top platform 102, and a rear-facing storage box 122 which may be accessed from the rear of top platform 102. Each of side-facing storage boxes 120 and rear-facing storage box 122 are preferably mounted to the underside of the flat bed. Side-facing storage boxes 120 are preferably sized and configured to receive overlays, and rear-facing storage box 122 is preferably sized and configured to receive paddle signs.

Taillight and mud flap mounting assemblies 124 extending downward from an underside of the flat bed. Each taillight and mud flap mounting assembly 124 preferably includes a rear facing taillight that is electrically connected to the vehicle's electrical system, and provides a mounting surface for mud flaps.

A bumper hitch assembly 126 is positioned at the back end of the truck bed providing both a rear-facing bumper and connector for receiving a trailer or other towed equipment. Likewise, a headboard assembly 118 is positioned at the forward end of the flat bed and is positioned to back against the back of the cab of the vehicle.

Various movable members may also be provided to selectively allow or block access to different areas of the flat bed, including side bars 112 that slide in a longitudinal direction into and out of storage boxes 108 to allow or block access into or out of manhole assembly 104, interior restraint bar 114 which may be slidably mounted to an interior side of each storage locker 106 and allow longitudinal sliding to allow or block access to the central storage area of the flat bed (which central storage area may be sized and configured to hold, by way of non-limiting example, traffic cones), and a manhole bar 116 that may be pivotably mounted to an end of the side frame of the flat bed so as to provide additional controlled access into or out of manhole assembly 104.

Figure 2:
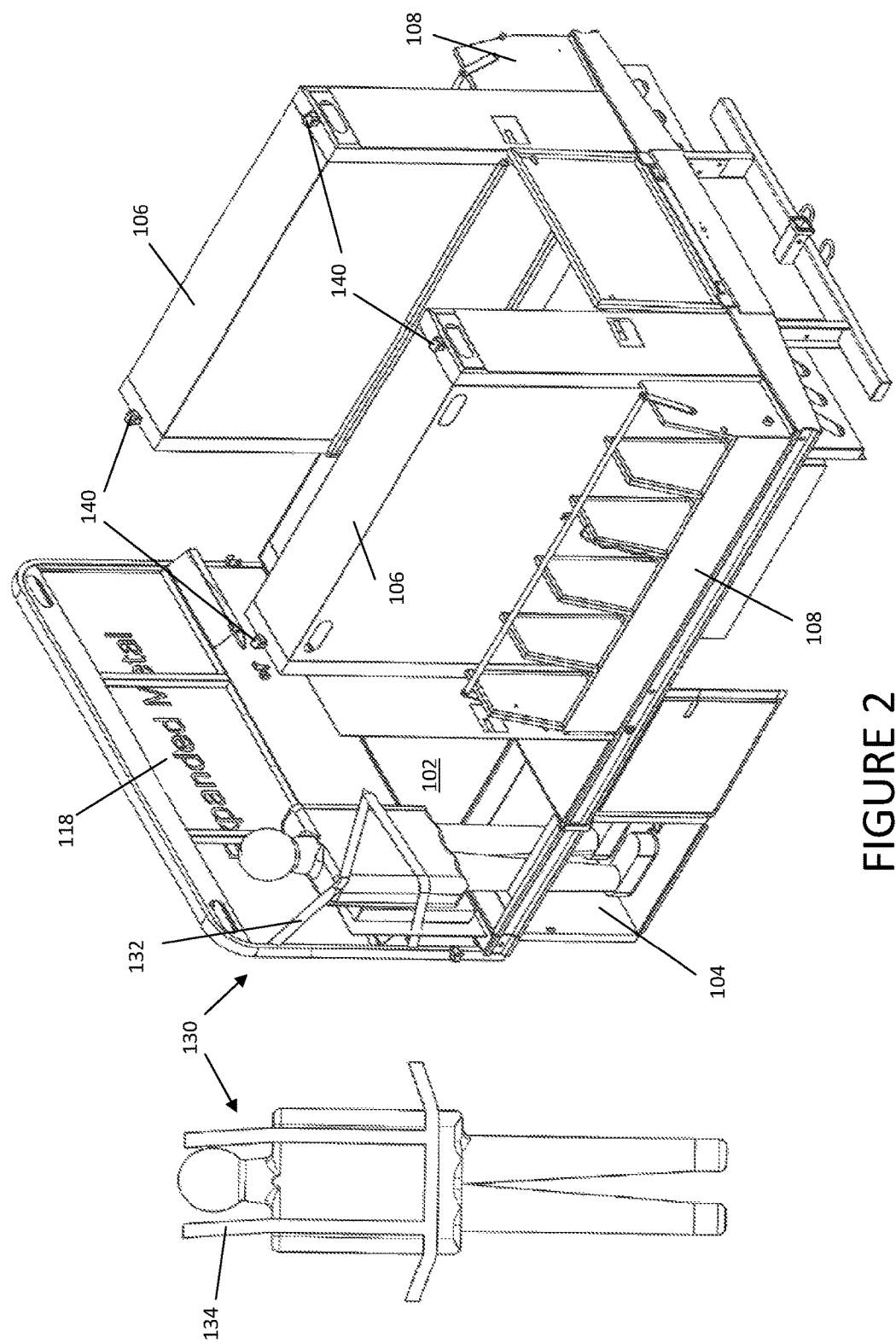
FIG. 2 is a perspective view of the utility truck bed of FIG. 1 in accordance with further aspects of an embodiment of the invention.

FIG. 2 provides a perspective view of utility truck bed 100 with a worker positioned in manhole assembly 104. To further protect the worker, such as while the vehicle is moving outside of setup operations, a restraint system (shown generally at 130) may be attached to headboard assembly 118 that extends over the worker's body. In certain configurations, restraint 132 system 130 may particularly comprise a 3-point safety restraint similar in configuration to a standard seatbelt in a vehicle. In other configurations, such restraint system 130 may particularly comprise a 4-point safety restraint 134. As shown in FIG. 2, the various storage areas positioned on top platform 102 of truck bed 100 are easily accessed by a worker standing in manhole assembly 104, with the lower level of the bottom of manhole assembly 104 allowing the worker to easily place equipment on the road surface without leaving manhole assembly 104.

Optionally, a video monitoring system 140 may be provided in the form of one or more video cameras positioned on the top surface of each storage locker 106.

Figure 10:
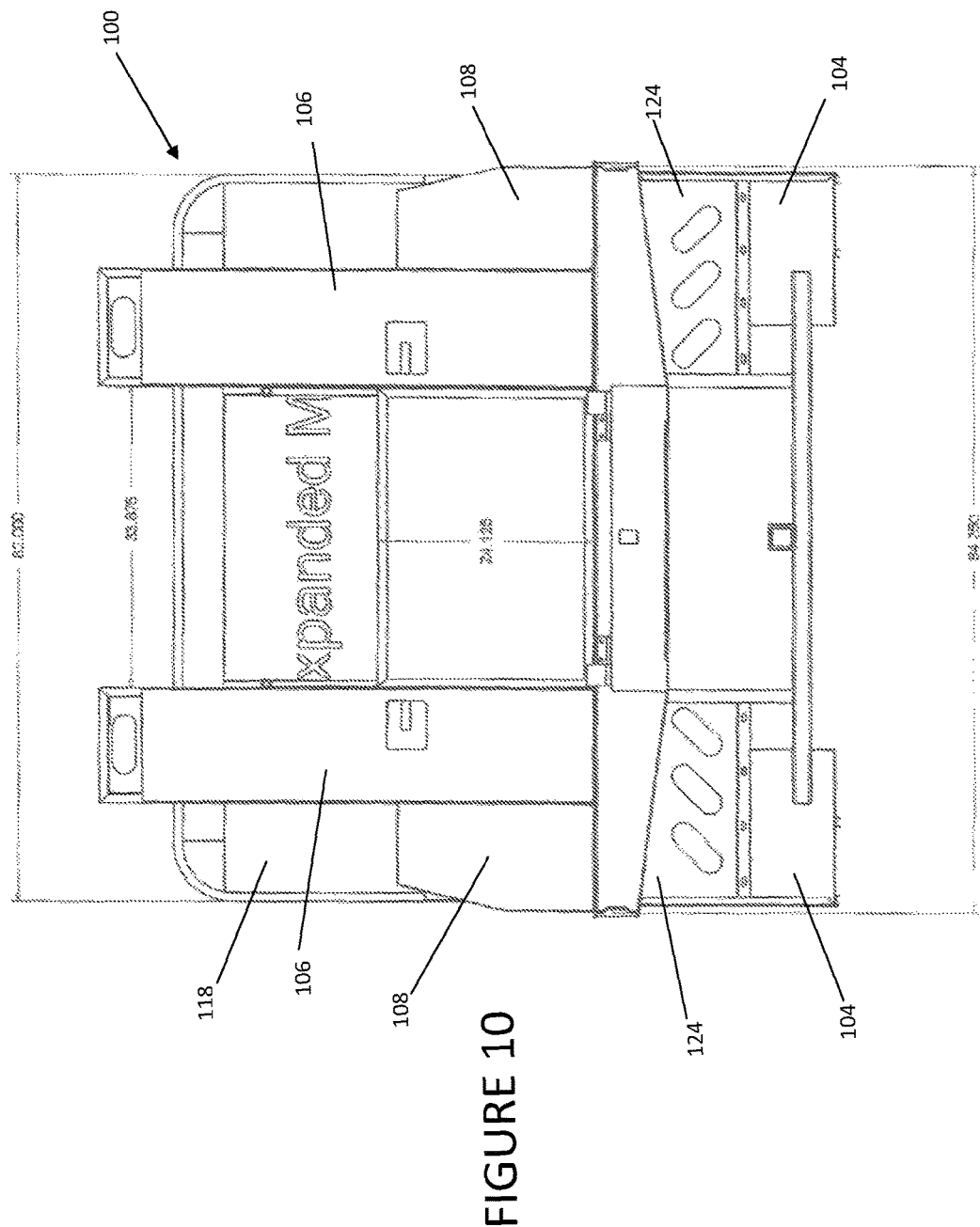
FIG. 10 is a rear view the utility truck bed of FIG. 1.

FIG. 10 provides a rear view of truck bed 100 showing all of the above-described elements as viewed from the back of truck bed 100.

Figure 3:
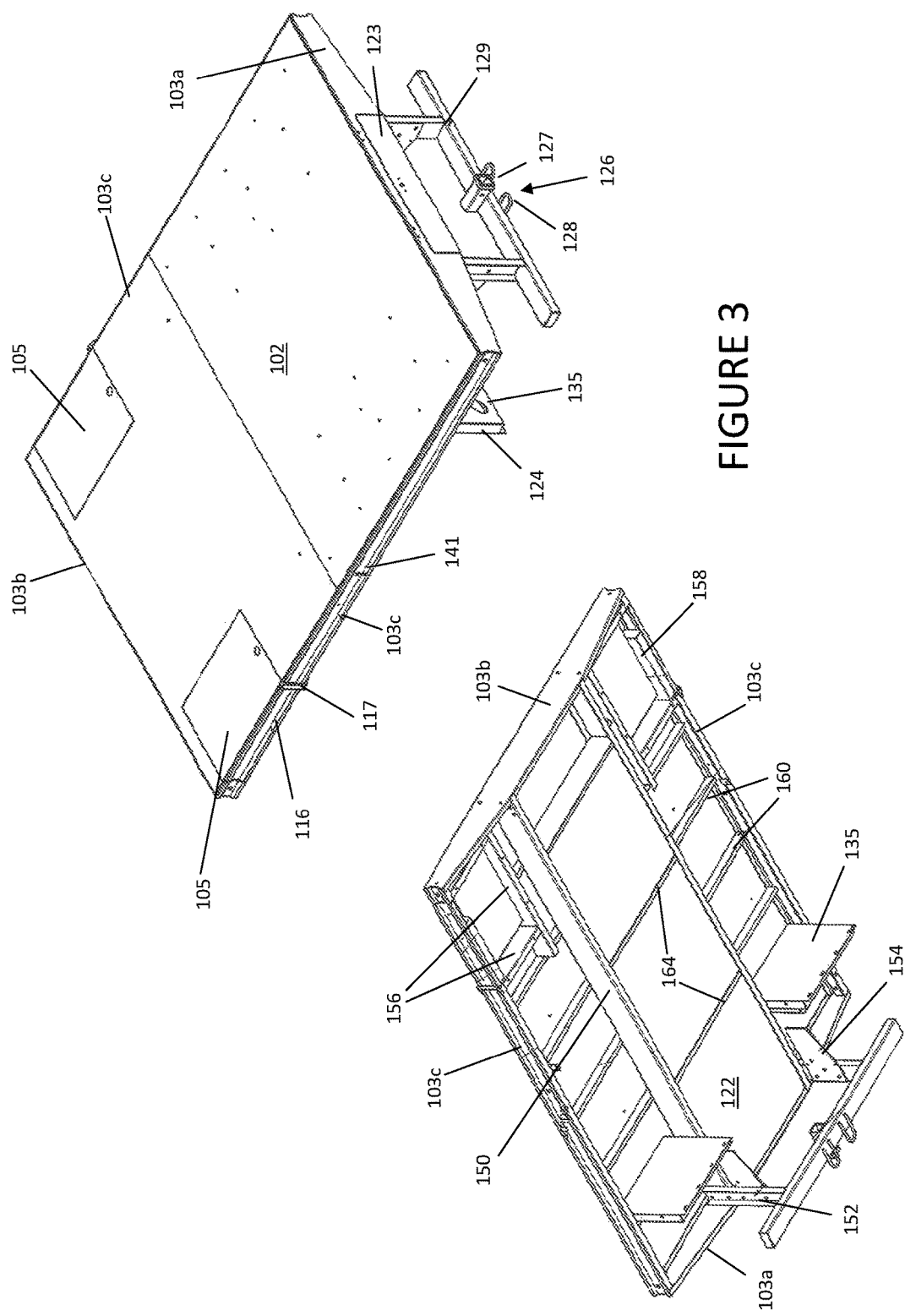
FIG. 3 provides perspective top and bottom views of a platform of the utility truck bed of FIG. 1.

Next, FIG. 3 provides top and bottom perspective views of flatbed platform 102. The top face of platform 102 is preferably formed of 11 gauge diamond trade plate steel. Both the front 103b and rear 103a edges of platform 102 are preferably formed of 11 gauge steel. Likewise, side edges 103c of platform 102 are preferably formed of 11 gauge steel. A lid 105 is positioned to cover each manhole assembly 104, and is pivotably mounted so as to pivot upward to allow open access to manhole assembly 104. Additionally, a removable pin 117 may be provided to lock manhole bar 116 in its closed position, and may be removed when a user wishes to enter or exit from manhole assembly 104. A door 123 is provided in rear 103a edge of platform 102 that provides access to rear-facing storage box 122.

With continued reference to FIG. 3, bumper hitch assembly 126 may include a hitch receiver 127 for connection to a pulled vehicle, and loops 128 for receiving hitch chains from such a pulled vehicle, each of which extend from a box tube bumper 129.

As noted above, taillight and mud flap mounting assembly 124 extends downward from an underside of platform 102, and forms a box 135 housing a vehicle taillight, a vehicle reverse light, and a vehicle flasher light. Additionally, cutouts 141 may be provided in side edges 103c configured to receive marker lights.

As shown in the bottom view of flatbed platform 102 of FIG. 3, flat bed frame rails 150 extending longitudinally along the underside of platform 102, generally parallel to side edges 103c. Channels 152 preferably extend downward from a back end of each frame rail 150, which channels 152 support box tube bumper 129. Gussets 154 may be welded to the truck vehicle frame and may be attached to channels 152 to provide additional structural support to increase towing capacity.

Manhole frame channel members 156 are also attached to an underside of flatbed platform 102 and form a support frame for manhole assembly 104. Pads 158 may be provided on an interior face of one or more of manhole frame channel members 156 so as to provide a protective cushion for workers standing in the manhole assembly. Further, channel cross members 160 are attached to the underside of flatbed platform 102, and extend laterally in a direction generally perpendicular to flat bed frame rails 150 and side edges 103c to complete a frame assembly for supporting flatbed platform 102. Importantly, such frame assembly of bed 100 is configured for direct mounting onto the frame of a standard vehicle, such as a pick-up truck. Thus, by removing the existing bed of the pick-up truck, bed 100 may be positioned in its place allowing easy retrofit onto existing vehicles, and even transplanting from one vehicle to another.

As mentioned above, storage box 122 extends longitudinally along the underside of flatbed platform 102, and is preferably additionally supported by reinforcement strips 164 extending between parallel pairs of flat bed frame rails 150 and below an underside of storage box 122.

Figure 4:
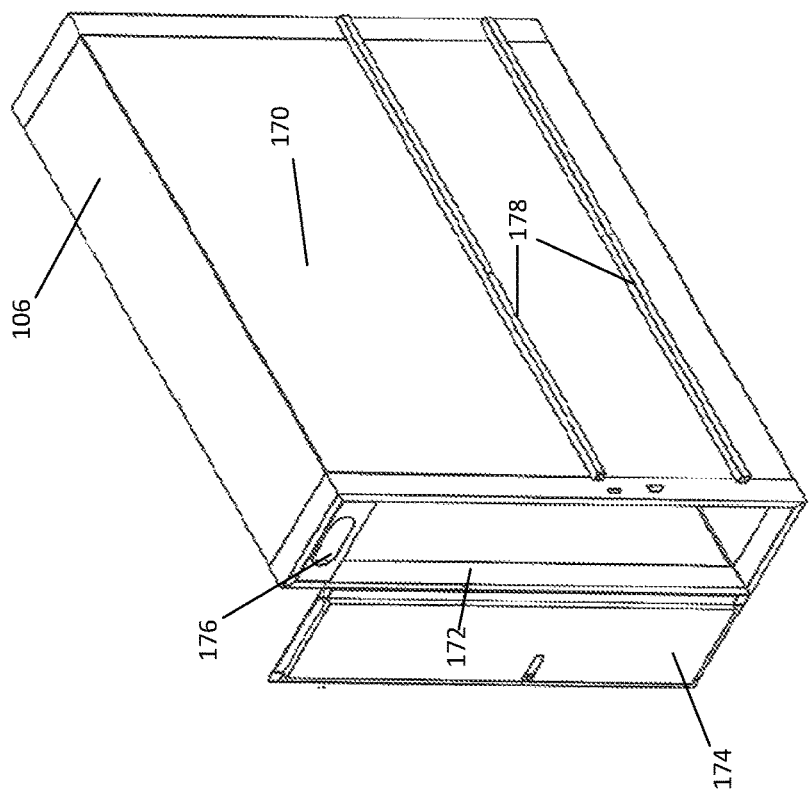
FIG. 4 provides interior and exterior side perspective views of a first storage compartment for use with the utility truck bed of FIG. 1.
Figure 4:
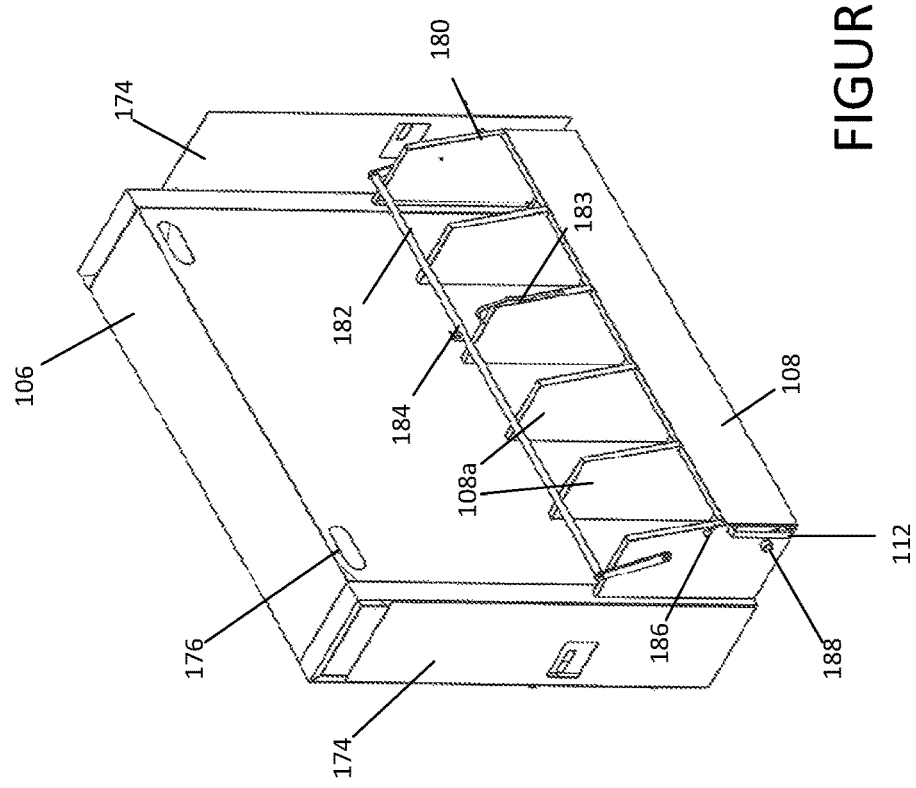

Next, and with reference to FIG. 4, storage lockers 106 are formed having side, top, and bottom walls preferably formed from 16 gauge sheet metal. Each end of each storage locker 106 preferably has a box tube frame 172 forming a generally rectangular opening, and a door 174 hingedly connected to such frame 172 at each end. A panel 176 having a cutout is provided at the top of frame 172 above door 174, with an opening through which an amber flashing safety light may be seen when such light is powered. The interior-facing side walls of each storage locker 106 are fitted with slide rails 178 that may extend outward from a front end of each locker 106. As best seen in FIG. 1, extending such slide rails 178 forward from each locker 106 provides a fence to separate a central storage area of flatbed 100 from each manhole assembly 104, thus preventing materials transported in such central storage area from inadvertently moving into a manhole assembly 104.

Next, and with reference to FIG. 4, positioned adjacent the exterior sidewalls of each storage locker 106 are storage boxes 108. Storage boxes 108 include separate compartments 180, formed by a plurality of vertical walls 108a, and sized and configured to hold various road signs. A bar 182 may be pivotably attached to each storage box 108 and positioned to swing from a position adjacent a side of storage box 108 to a position overtop of storage box 108 so as to hold contents of storage box 108, such as various road signs, in place. Bar 182 is preferably spring loaded so as to hold its position overtop of storage box 108 through movement of the vehicle. A chain 183 and chain latch 184 may also be provided to latch the bar in place. Further, a stop 186 may be provided on a front wall of storage box 108 to limit downward travel of bar 182. Likewise, a door stop 188 may be provided on the front wall of storage box 108 to stop opening movement of the door 174 of storage locker 106. Finally, as best seen in FIG. 4, slide bar 112 is preferably extensible from a compartment at the outer edge of storage box 108.

Figure 5:
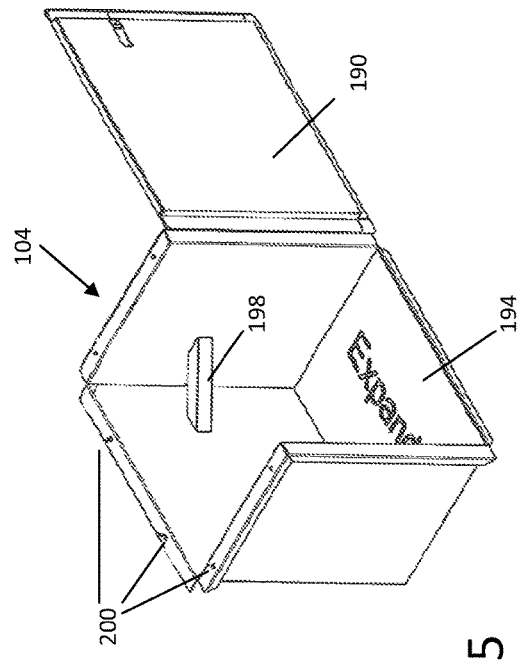
FIG. 5 provides front and rear perspective views of a well for use with the utility truck bed of FIG. 1.

Next, FIG. 5 shows front and rear perspective views of manhole assembly 104. Each manhole assembly 104 includes a 16 gauge double layer door 190 hingedly connected to the frame of manhole assembly 104. When door 190 is closed, manhole assembly 104 may serve as a storage box. Manhole assembly 104 includes 14 gauge steel sidewalls 192, and an expanded metal floor 194. The bottom of each manhole assembly 104 is supported by box tube expanded metal supports 196. Optionally, an angle iron step 198 may be provided on an interior of manhole assembly 104 positioned in a corner of the manhole and aiding a worker in exiting the manhole through the open top. The entire manhole assembly is preferably joined to channels 156 (FIG. 3) with threaded connectors, such as screws, bolts, or the like extending through holes 200 and into channels 156.

Figure 6:
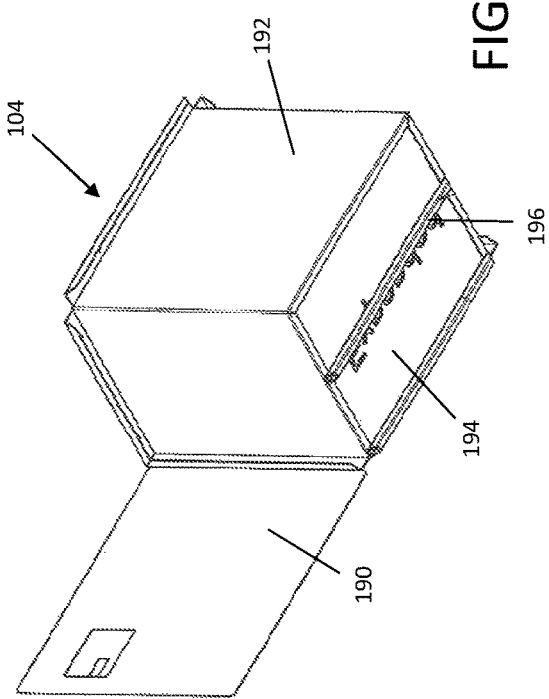
FIG. 6 is a perspective view of a storage compartment for use with the utility truck bed of FIG. 1.
Figure 6:
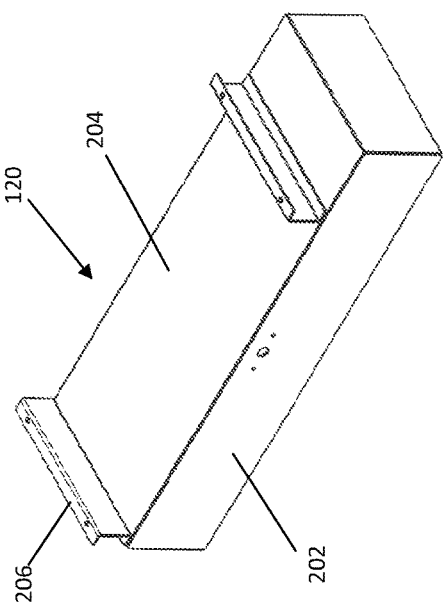

Next, FIG. 6 shows a top perspective view of storage box 120, including an 11 gauge door 202 accessible from a side of truck bed 100 to provide access to the interior of box 120, 16 gauge walls 204, and 11 gauge channels 206 for mounting storage box 120 to the bottom of truck bed 100.

Figure 7:
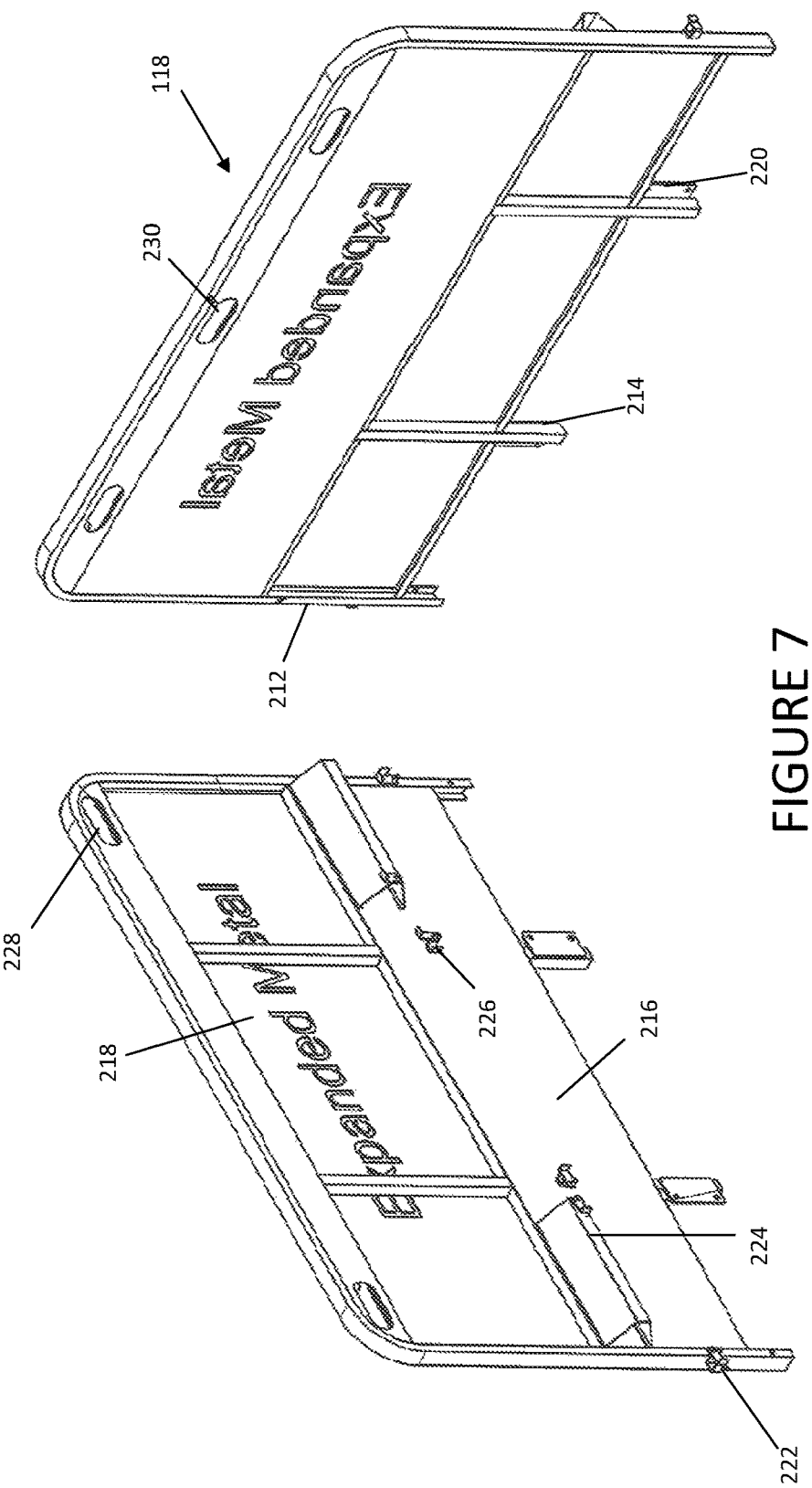
FIG. 7 provides front and rear perspective views of a headboard for use with the utility truck bed of FIG. 1.

FIG. 7 shows front and back perspective views of headboard assembly 118. Headboard assembly 118 includes channel members 212 forming an exterior frame and vertical box tube supports 214 forming central vertical supports of the frame. A section of 14 gauge sheet metal provides a first panel 216 to protect the cab of the vehicle, and a section of expanded metal at cab window height forms a second panel 218. Connection tabs 220 are attached to center supports 214 and are configured to mount the headboard assembly 118 to the truck bed.

Headboard assembly 118 may include latches 222 each configured to receive an end of a side bar 112 when in its extended position, as well as a rest and latch 224 for the lid 105 of manhole assembly 104 when in its raised, open position. Further, headboard assembly 118 may include a latch 226 configured to receive an end of restraint bar 114 when in its extended position. Cutouts 228 may also be provided along the top, rear portion of headboard assembly 118, through which rear-facing floodlights may shine, and cutouts 230 may be provided along the top, front portion of headboard assembly 118, through which flashers (such as flashing amber caution lights) may shine.

Figure 8:
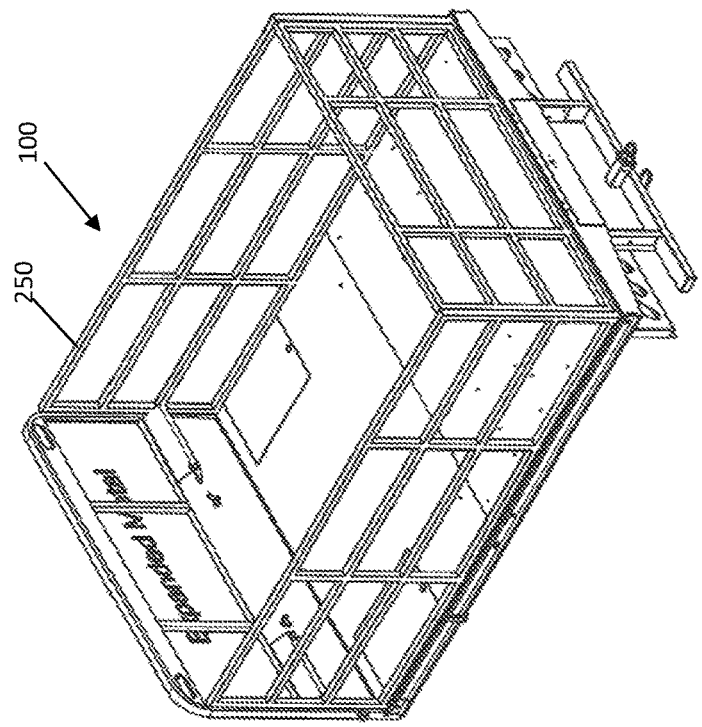
FIG. 8 provides perspective views of the utility truck bed of FIG. 1 in accordance with still further aspects of an embodiment of the invention.
Figure 8:
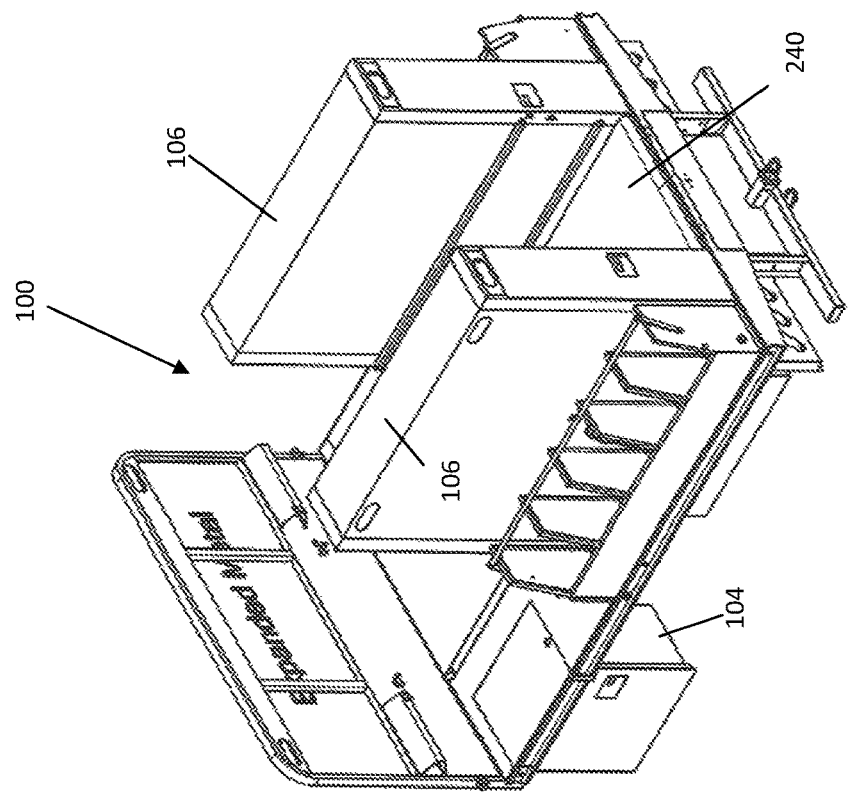
Figure 9:
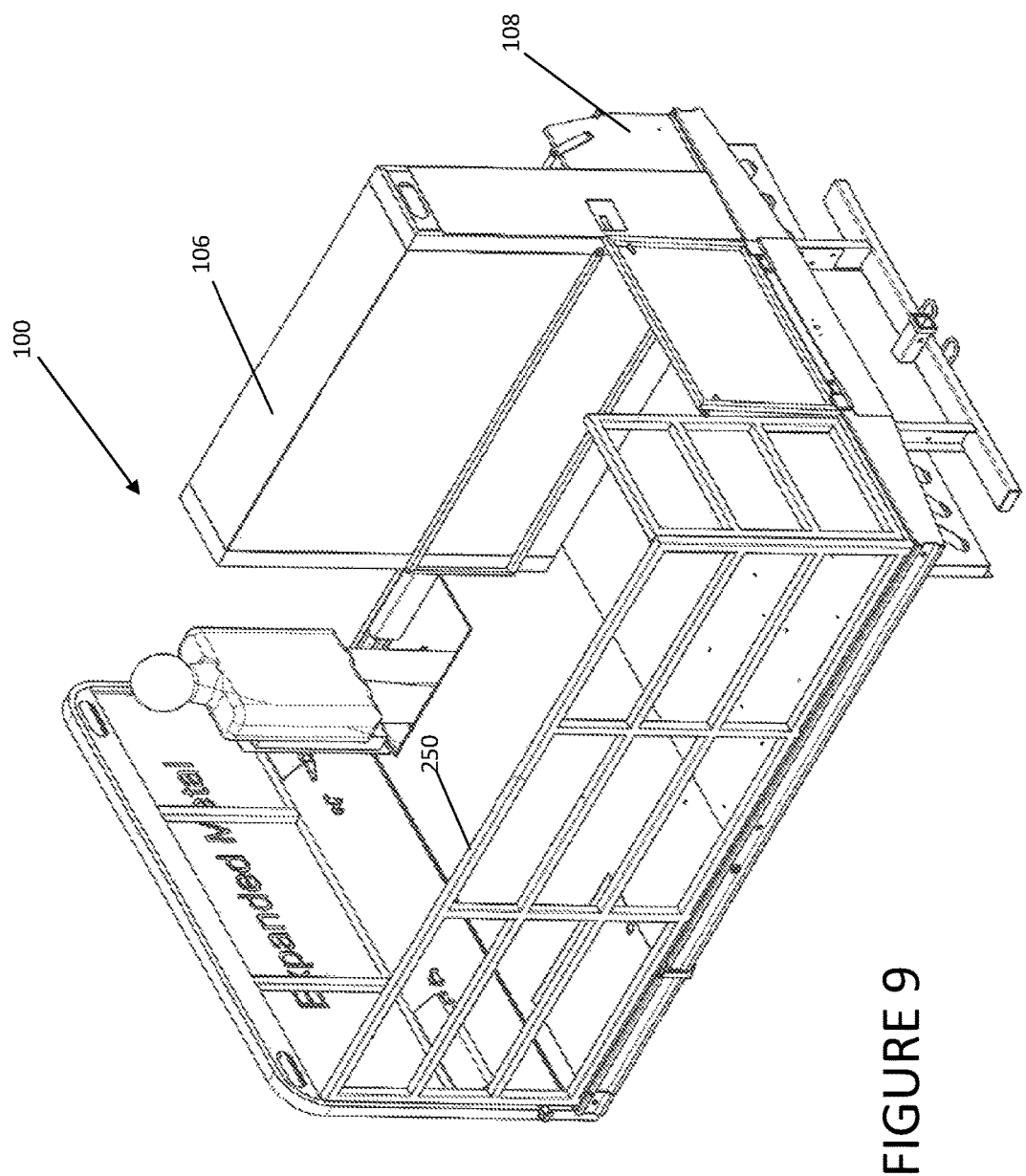
FIG. 9 provides a perspective view of the utility truck bed of FIG. 1 in accordance with still further aspects of an embodiment of the invention.

FIGS. 8 and 9 provide optional configurations for truck bed 100. For instance, truck bed 100 may include a conveyor 240 positioned between storage lockers 106 and configured to move items longitudinally along truck bed 100 from a rear of the truck bed 100 towards manhole assembly 104, thus allowing a worker in manhole assembly 104 easier access to items stored towards the back end of truck bed 100. Likewise, storage lockers 106 and storage boxes 108 may be removably mounted on truck bed 100. With removal of these items, truck bed 100 may easily be converted into a stake truck configuration through attachment of stake sections 250 around the perimeter of truck bed 100. Optionally, and as shown in FIG. 9, a single storage locker 106 and storage box 108 may be removed, thus providing a dual use vehicle serving partially as a stake truck and partially as a mobile traffic control setup station as described above.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A utility truck bed comprising:
a horizontal truck bed platform having a top surface, a bottom surface, a front edge, a rear edge, a first side edge, and a second side edge;
a well extending downward from said horizontal truck bed platform, said well having a front side wall, a rear side wall, an interior side wall extending between said front side wall and said rear side wall, and a well floor attached to a bottom edge of said front, rear, and interior side walls, wherein said front side wall and said rear side wall of said well extend parallel to said front edge and said rear edge, respectively, of said truck bed platform;
a first storage compartment on said top surface of said truck bed platform positioned inward from said first side edge of said truck bed platform;
a second storage compartment on said top surface of said truck bed platform positioned between said first storage compartment and said first side edge of said truck bed platform, and between said well and said rear edge of said truck bed platform, said second storage compartment having a height dimension that is shorter than a height dimension of said first storage compartment; and
a side bar slidable from said second storage compartment across an exterior side of said well and to said front edge of said truck bed platform, wherein said side bar is storable and extensible from a hollow outer wall of said second storage compartment.

2. The utility truck bed of claim 1, further comprising:
a vertical headboard extending upward from said front edge of said truck bed platform.

3. The utility truck bed of claim 2, further comprising a passenger restraint affixed to said headboard and positioned to restrain a person standing in said well.

4. The utility truck bed of claim 3, said first storage compartment having an exterior facing wall adjacent said second storage compartment and an interior facing wall opposite said exterior facing wall, and an interior restraint bar slidably attached to said interior facing wall toward said headboard.

5. The utility truck bed of claim 4, said headboard further comprising a latch configured to removably hold an end of said interior restraint bar.

6. The utility truck bed of claim 1, wherein said first storage compartment further comprises a locker, said locker having a pivotably mounted door facing said rear edge of said truck bed platform.

7. The utility truck bed of claim 6, further comprising a flasher light positioned above said door.

8. The utility truck bed of claim 6, said second storage compartment having a first side wall aligned with said first side edge of said truck bed platform, a second side wall adjacent an exterior facing wall of said locker, a front wall adjacent said well, a rear wall, and a plurality of interior vertical walls forming a plurality of open-top storage slots within said second storage compartment.

9. The utility truck bed of claim 8, further comprising a retaining bar pivotably mounted to said front wall and said rear wall of said second storage compartment and movable toward a position in which said retaining bar extends over a top edge of said second storage compartment.

10. The utility truck bed of claim 1, further comprising a pivotably mounted door extending between said front side wall and said rear side wall of said well and opposite said interior side wall of said well.

11. The utility truck bed of claim 1, further comprising a pivotably mounted hatch cover extending over said well.

12. The utility truck bed of claim 1, wherein said first and second storage compartments are removably mounted on said top surface of said truck bed.

13. The utility truck bed of claim 12, wherein said top surface of said truck bed platform is further comprises a plurality of stake-bed rail sections.

14. A utility truck bed comprising:
a horizontal truck bed platform configured for retrofit attachment to a vehicle frame;
a first well extending downward from said horizontal truck bed platform and opening to a first side edge of said truck bed platform, said first well having a first well floor positioned at a height below said horizontal truck bed platform;
a second well extending downward from said horizontal truck bed platform and opening to a second side edge of said truck bed platform, said second well having a second well floor positioned at a height below said horizontal truck bed platform;

a first storage compartment on said truck bed platform positioned inward from said first side edge of said truck bed platform;
a second storage compartment on said truck bed platform positioned between said first storage compartment and said first side edge of said truck bed platform, said second storage compartment having a height dimension that is shorter than a height dimension of said first storage compartment, and further comprising a side bar slidable from said second storage compartment across an exterior said of said first well and to a front edge of said truck bed platform, wherein said side bar is storable and extensible from a hollow outer wall of said second storage compartment;
a third storage compartment on said truck bed platform positioned inward from said second side edge of said truck bed platform; and
a fourth storage compartment on said truck bed platform positioned between said third storage compartment and said second side edge of said truck bed platform, said fourth storage compartment having a height dimension that is shorter than a height dimension of said third storage compartment.

15. The utility truck bed of claim 14, further comprising:
a headboard affixed to a front edge of said truck bed platform;
a first restraint fixedly attached to said headboard and positioned to restrain a person standing in said first well; and
a second restraint fixedly attached to said headboard and positioned to restrain a person standing in said second well.

16. The utility truck bed of claim 15, wherein said first storage compartment and said third storage compartment are positioned on said truck bed so as to define an open storage space between them that is accessible to a person restrained in said first well or said second well.

17. The utility truck bed of claim 14, wherein each of said second storage compartment and said fourth storage compartment comprises a plurality of interior vertical walls forming a plurality of open-top storage slots within said second storage compartment and within said fourth storage compartment.

18. The utility truck bed of claim 17, further comprising a first retaining bar pivotably mounted to said second storage compartment and spring biased toward a position in which said first retaining bar extends over a top edge of said second storage compartment, and a second retaining bar pivotably mounted to said fourth storage compartment and movable toward a position in which said second retaining bar extends over a top edge of said fourth storage compartment.

19. A utility truck bed comprising:
a horizontal truck bed platform having a top surface, a bottom surface, a front edge, a rear edge, a first side edge, and a second side edge;
a well extending downward from said horizontal truck bed platform, said well having a front side wall, a rear side wall, an interior side wall extending between said front side wall and said rear side wall, and a well floor attached to a bottom edge of said front, rear, and interior side walls, wherein said front side wall and said rear side wall of said well extend parallel to said front edge and said rear edge, respectively, of said truck bed platform;
a first storage compartment on said top surface of said truck bed platform positioned inward from said first side of said truck bed platform;
a second storage compartment on said top surface of said truck bed platform positioned between said first storage compartment and said first side edge of said truck bed platform, and between said well and said rear edge of said truck bed platform, said second storage compartment having a height dimension that is shorter than a height dimension of said first storage compartment;
a vertical headboard extending upward from said front edge of said truck bed platform;
wherein said first storage compartment has an exterior facing wall adjacent said second storage compartment and an interior facing wall opposite said exterior facing wall, and an interior restraint bar slidably attached to said interior facing wall toward said headboard.

20. The utility truck bed of claim 19, said headboard further comprising a latch configured to removably hold an end of said interior restraint bar.

21. A utility truck bed comprising:
a horizontal truck bed platform having a top surface, a bottom surface, a front edge, a rear edge, a first side edge, and a second side edge;
a well extending downward from said horizontal truck bed platform, said well having a front side wall, a rear side wall, an interior side wall extending between said front side wall and said rear side wall, and a well floor attached to a bottom edge of said front, rear, and interior side walls, wherein said front side wall and said rear side wall of said well extend parallel to said front edge and said rear edge, respectively, of said truck bed platform;
a first storage compartment on said top surface of said truck bed platform positioned inward from said first side of said truck bed platform; and
a second storage compartment on said top surface of said truck bed platform positioned between said first storage compartment and said first side edge of said truck bed platform, and between said well and said rear edge of said truck bed platform, said second storage compartment having a height dimension that is shorter than a height dimension of said first storage compartment, said second storage compartment further comprising a first side wall aligned with said first side edge of said truck bed platform, a second side wall adjacent an exterior facing wall of said first storage compartment, a front wall adjacent said well, a real wall, and a plurality of interior vertical walls forming a plurality of open-top storage slots within said second storage compartment, and a retaining bar pivotably mounted to said front wall and said rear wall of said second storage compartment and movable toward a position in which said retaining bar extends over a top edge of said second storage compartment.

* * * * *